Sept. 20, 1938. O. ACKERMANN 2,130,829
ELECTRICAL MEASURING INSTRUMENT
Filed Dec. 17, 1936
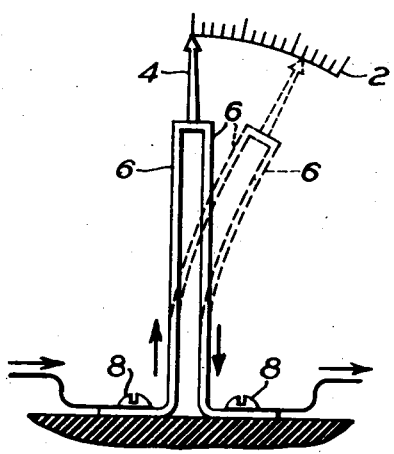
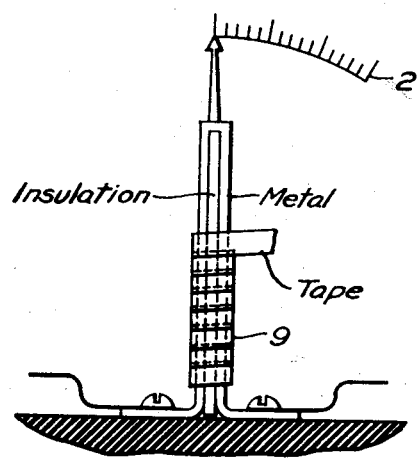
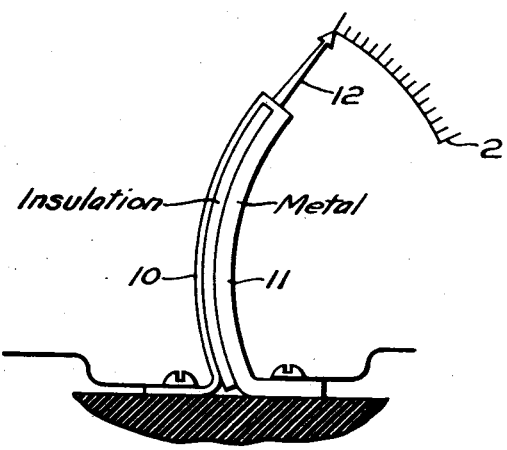
WITNESSES:
INVENTOR
Otto Ackermann.
BY
ATTORNEY Patented Sept. 20, 1938

2,130,829

UNITED STATES PATENT OFFICE 2,130,829

ELECTRICAL MEASURING INSTRUMENT

Otto Ackermann, Irwin, Pa., assignor to Westinghouse Electric & Manufacturing Company, East Pittsburgh, Pa., a corporation of Pennsylvania Application December 17, 1936, Serial No. 116,331

4 Claims. (Cl. 171—95)

The present invention relates to electrical measuring instruments and more particularly to an instrument of the thermal type for measuring the magnitude of electrical currents.

In the past, instruments of this general type have been actuated by bimetallic elements comprising two strips of material having different coefficients of thermal expansion secured together throughout their lengths, as by riveting, soldering or otherwise. Such an element has the disadvantage, however, for some applications, that the current in traversing the strip sets up magnetic forces which cause its deflection, and, of course, such strips are also deflected by ambient temperature variation and must be calibrated or compensated in accordance with ambient temperature changes.

It is an object of the present invention to provide a thermal element of the bimetallic type, for actuating an indicating member, which will be free of ambient temperature effects, will not be subjected to magnetic stress by currents traversing it, and which will have other advantages as will be obvious from the following description.

Referring to the accompanying drawing,

Figure 1 is a schematic view of a measuring instrument constructed in accordance with the invention, Fig. 2 is a view of a practical embodiment and of the structure shown in Fig. 1, and Fig. 3 is a schematic view of a modification of the invention illustrated in Fig. 1.

Referring to Fig. 1, the measuring instrument includes a scale 2 and an indicating pointer 4 for cooperation therewith. The indicator 4 is deflected by a pair of metallic strips 6 electrically connected together only at the upper ends thereof and terminating in horizontally extending portions provided with terminal screws 8. It is intended that the current to be measured shall traverse the two strips 6 in series, as indicated by the arrows in Fig. 1.

In view of the series connection of the two strips 6, any magnetic forces acting upon one of them will be substantially equal and opposite to forces set up by current traversing the other, and, therefore, cause no movement of the indicator 4.

The two strips 6 are of materials having substantially the same coefficient of thermal expansion, to thereby eliminate any movement of the indicator 4 caused by variations in ambient temperature. However, the strips 6 have widely different coefficients of electrical resistance so that the current traversing them will cause different heating effects therein and accordingly different degrees of expansion. This, in turn, will cause a movement of the indicator 4 across the scale to a position, as indicated in the dotted lines, indicative of the magnitude of the current traversing the strips. A strip of brass and one of nickel-chromium alloy are effective for this purpose.

In practice, the strips 6 would not be spaced as widely as indicated in Fig. 1, but would be rather close together, separated by suitable insulation and preferably bound together, as by tape 9 shown in Fig. 2.

A modification of the invention is shown in Fig. 3, comprising two strips 10 and 11 electrically connected together at their upper ends and provided with an arm for actuating an indicating pointer 12. In this modification, the strips 10 and 11 are still of materials having substantially the same coefficient of thermal expansion and to insure that they are of the same cofficient they may be of the same material. However, in this case, the different electrical resistance values of the strips is obtained by making them of different cross-sectional area. When current traverses the strips, a deflection of the indicator 12 will be obtained in accordance with the theory of operation in Fig. 1. In view of the difference in strength of the two strips, the assembly is preferably bowed, as shown, to insure that the smaller strip 10 will not buckle in bending the stronger strip 11.

As previously mentioned, a device of this character is useful for measuring electrical energy generally, either to indicate or record the measured quantity, or for controlling the operation of other devices. It is intended, therefore, that the invention shall be limited only by the prior art and the appended claims.

I claim as my invention:

1. In an electrical instrument, indicating means and means for actuating it in accordance with the magnitude of an electrical quantity comprising a bimetallic member including two elements having substantially the same coefficient of thermal expansion and different coefficients of electrical resistance, and means for causing an electric current to be measured to traverse said elements in series.

2. In a measuring instrument, including an indicator, means for actuating said indicator in accordance with the magnitude of a quantity comprising a pair of strips electrically connected to each other only at one end to be traversed in series by an electric current proportional to the magnitude of such quantity, said strips being of different electrical resistance to cause a deflection of said one end in accordance with the differential expansion of the strips caused by the different degree of heating thereof; the materials of said strips having substantially the same coefficients of thermal expansion.

3. A thermal actuating device comprising a bimetallic member, the two elements of which are of materials having substantially the same coefficients of thermal expansion and different coefficients of electrical resistance, and means for causing an electric current to traverse said two elements in series.

4. A thermal actuating device comprising two strips electrically connected together at one end thereof and insulated from each other throughout the remainder of their lengths, said strips being of different electrical resistance longitudinally thereof and of substantially the same coefficient of thermal expansion, and means for causing an electric current to traverse said strips in series.

OTTO ACKERMANN.